J. V. ROBINSON.
AUTOMATIC TRAIN PIPE CONNECTOR.
APPLICATION FILED APR. 6, 1914. RENEWED MAY 1, 1917.
1,245,795.
Patented Nov. 6, 1917.
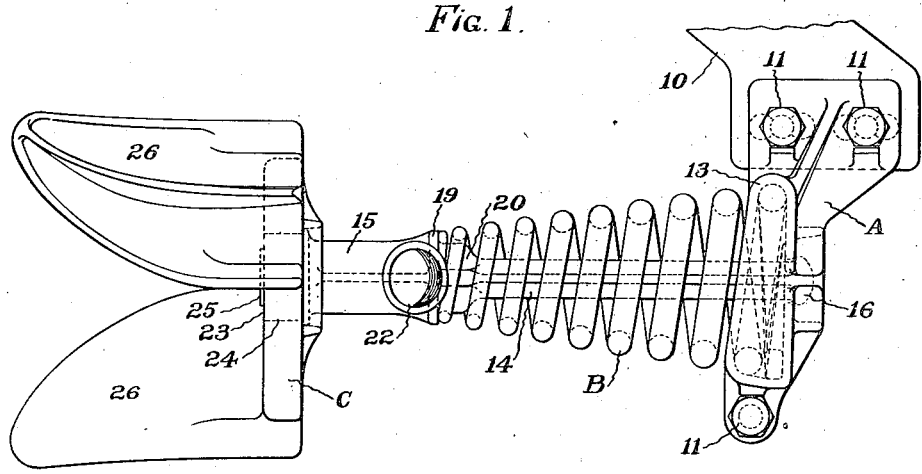
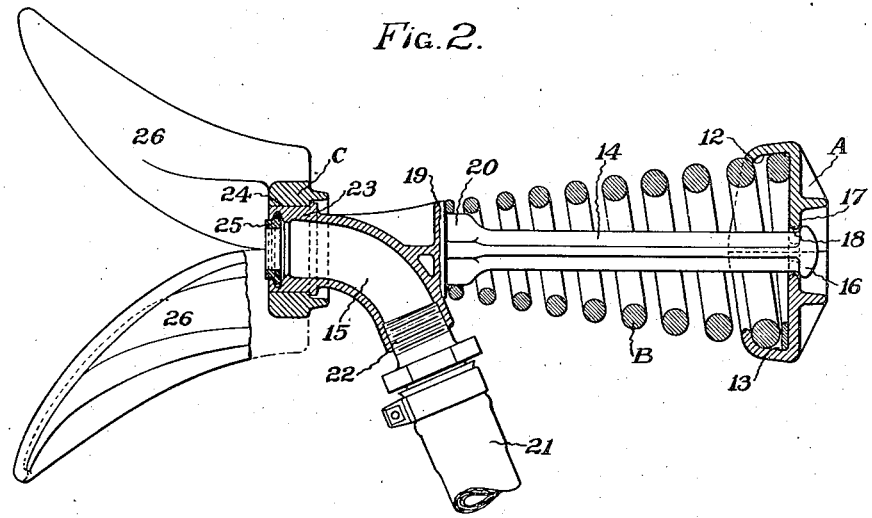
Witnesses
L. A. Brooke.
M. C. Sheridan.
Inventor
Joseph V. Robinson
J. A. Watson
Attorney

UNITED STATES PATENT OFFICE.

JOSEPH V. ROBINSON, OF BRANFORD, CONNECTICUT.

AUTOMATIC TRAIN-PIPE CONNECTOR.

1,245,795.  Specification of Letters Patent.  Patented Nov. 6, 1917.

Application filed April 6, 1914, Serial No. 830,010. Renewed May 1, 1917. Serial No. 165,798.

*To all whom it may concern:*

Be it known that I, JOSEPH V. ROBINSON, a citizen of the United States, and a resident of Branford, county of New Haven, State of Connecticut, have invented certain new and useful Improvements in Automatic Train-Pipe Connectors, of which the following is a specification.

This invention relates to automatic train pipe connectors for railway cars and has among its objects to provide an improved support for the connector head which will be simple and strong and permit free universal movement of the head in service.

To this end the invention consists in the combinations, arrangements and constructions which will be hereinafter fully described, pointed out in the claims and illustrated in the accompanying drawings, in which:

Figure 1 is a side elevation of my improved connector, and

Fig. 2, is a longitudinal sectional plan view thereof.

Referring to the drawings: My invention comprises a two-piece base A bolted together and to a lug 10 of the car by bolts 11. The base is provided with undercut seats or grooves 12 and 13 within which a supporting spring B is rigidly held when the base is assembled and bolted together. Said spring is coiled of a gradually tapering bar and offers a varying resistance to movement of the connector head C from the normal uncoupled position.

The spring is interposed between the connector head C and the base A and surrounds a stem 14 leading from a fluid conduit 15. Said stem is provided at its rear end with a head 16 normally bearing against the rear face 17 of the base, to prevent excessive forward movement of the connector head. The stem is cross-shape in cross section and fits within a correspondingly shaped opening 18 in the base to prevent undue rotation of the connector head relative to the base A and spring B.

The forward end of the stem carries an annular shoulder 19 and its ribs 20 are widened at this point sufficiently to fit closely within the spring B. Against said shoulder and upon said ribs the forward end of the spring B is seated, the distance from said shoulder to the head 16 of the stem being such as to maintain the spring normally under slight compression.

The stem and conduit 15 are connected in any suitable manner, the latter being curved so as to diverge laterally of the stem and head C at a point back of the head and in front of the base A. The hose 21 of the car is detachably connected to the fitting at 22 in any satisfactory way such as by one of the present standard hose nipples or the ordinary hand hose coupling now universally used.

An enlarged portion 23 is provided on the conduit and pressed into an aperture 24 of the connector head C and through the latter. A gasket 25 of any desired construction and material is mounted in the forward end of the portion 23 to insure proper air tight connection when two connector heads couple up in service.

I have shown a connector head C of the butt-face type having two diagonally spaced forwardly extending outwardly diverging guiding prongs 26 for alining the heads on curves, etc. However, in lieu of this form of head, any suitable type may be used with my improved support.

When two automatic connectors constructed according to my invention come together in the act of coupling, the heads C are accurately alined by the guiding prongs 26, the spring B yielding to permit of such alinement. Further forward movement of the cars will compress the supporting spring B and effect a tight and efficient joint between the face of the connector heads C. In uncoupling, the operation of the connectors will be the reverse of this.

Having thus described my said invention, what I claim as new and desire to secure by United States Letters Patent is:

1. An automatic train pipe connector comprising, in combination, a base provided with a groove in one face, a connector head, a fluid conduit extending through the head and diverging to one side of the head in rear thereof, a stem connected with the conduit and extending rearwardly to the base, and a spiral supporting spring seated in the groove in the base and acting against said conduit to extend the head.

2. An automatic train pipe connector comprising, in combination, a base provided with a groove in one face, a connector head, a fluid conduit extending through the head and diverging to one side of the head in rear thereof, a stem connected with the conduit and extending rearwardly through the base, said stem having at its rear end means for engaging the base to limit forward movement of the head and stem, and a spiral supporting spring seated in the groove in the base and acting against an abutment on the fluid conduit.

3. In an automatic train pipe connector, the combination of a connector head, a fluid conduit diverging to one side of said head at the rear thereof, a non-resilient stem extending from said conduit through said base, a spring surrounding said stem for supporting said connector head, said spring having one end fixed relative to said base, and means on the stem arranged to engage the base for preventing undue forward movement of said head relative to the base.

4. In an automatic train pipe connector, the combination of a base provided with a groove, a connector head, a curved fluid conduit having a portion which extends through said head and having also a stem which extends through said base, a seat at the rear of said conduit, and a spiral supporting spring for said head coiled of a tapered bar and mounted in said seat, one end of said spring being locked in the groove of said base substantially as described.

5. In an automatic train pipe connector, the combination of a connector head, a fluid conduit diverging laterally of said head and upon which conduit said head is mounted, a two-piece base provided with an opening and having also a groove, a stem extending from said conduit through the opening in said base for preventing undue forward and rotary movement of said head, and a spring surrounding said stem for supporting said head, said spring being coiled of a gradually tapering bar and having one end rigidly locked in the groove of said base.

In testimony whereof, I have hereunto set my hand in the presence of two witnesses.

JOSEPH V. ROBINSON.

In the presence of—
M. H. BRAKHAGEN,
ARTHUR L. BRYANT.